United States Patent
Engelmann et al.

(10) Patent No.: US 7,271,382 B2
(45) Date of Patent: Sep. 18, 2007

(54) PROCESS FOR THE OBSERVATION OF AT LEAST ONE SAMPLE REGION WITH A LIGHT RASTER MICROSCOPE WITH LIGHT DISTRIBUTION IN THE FORM OF A POINT

(75) Inventors: Ralf Engelmann, Jena (DE); Joerg-Michael Funk, Jena (DE); Joerg Steinert, Jena (DE); Bernhard Zimmermann, Jena (DE); Stefan Wilhelm, Jena (DE); Joerg Engel, Weida (DE); Ulrich Meisel, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 10/967,636

(22) Filed: Oct. 19, 2004

(65) Prior Publication Data

US 2006/0011824 A1    Jan. 19, 2006

(30) Foreign Application Priority Data

Jul. 16, 2004   (DE) .................... 10 2004 034 979

(51) Int. Cl.
  *H01J 3/14*   (2006.01)
  *H01J 5/16*   (2006.01)
  *H01J 40/14*  (2006.01)
  *G06K 9/00*   (2006.01)
(52) U.S. Cl. .................... 250/234; 250/235; 382/318
(58) Field of Classification Search ............... 250/234, 250/235; 382/318
  See application file for complete search history.

(56) References Cited

U.S. PATENT DOCUMENTS 4,973,848 A * 11/1990 Kolobanov et al. ...... 250/458.1

(Continued)

FOREIGN PATENT DOCUMENTS

CA     2267431 A1    2/1999

(Continued)

OTHER PUBLICATIONS

Edited by J. B. Pawley, Handbook of Biological Confocal Microscopy, Second Ed., 1995, Chapter 29, pp. 461-462 "Resonant Galvanometers".

(Continued)

*Primary Examiner*—Thanh X. Luu
*Assistant Examiner*—Brian Livedalen
(74) *Attorney, Agent, or Firm*—Jacobson Holman PLLC

(57) ABSTRACT

Process for the observation of at least one sample region with a light raster microscope by a relative movement between the illumination light and sample via first scanning means along at least one scanning axis essentially perpendicular to the illumination axis wherein the illumination light illuminates the sample in parallel at several points or regions and several points or regions are detected simultaneously wherein at an angle to the plane of the relative movement, preferably perpendicular thereto, second scanning means are moved and an image acquisition takes place by the movement of the first and second scanning means being coupled and a three-dimensional sampling movement being done by the illumination of the sample wherein the second scanning means are coupled to the movement of the first scanning means in such a manner that straight and/or curved lines and/or plane and/or curved surfaces are scanned which are extended along at least one scanning direction of the first scanning means as well as along the scanning direction of the second scanning means.

43 Claims, 13 Drawing Sheets

U.S. PATENT DOCUMENTS

| | | | |
|---|---|---|---|
| 6,028,306 | A | 2/2000 | Hayashi |
| 6,037,583 | A | 3/2000 | Moehler et al. |
| 6,636,351 | B2 | 10/2003 | Weyh et al. |
| 2001/0019105 | A1* | 9/2001 | Wake et al. .............. 250/234 |
| 2002/0020800 | A1* | 2/2002 | Knebel et al. ........... 250/201.3 |
| 2002/0158966 | A1 | 10/2002 | Olschewski et al. |
| 2003/0132394 | A1 | 7/2003 | Wolleschensky |
| 2004/0031930 | A1 | 2/2004 | Wolleschensky |
| 2005/0036667 | A1* | 2/2005 | So et al. ................. 382/128 |
| 2005/0094261 | A1 | 5/2005 | Hell et al. |

FOREIGN PATENT DOCUMENTS

| | | |
|---|---|---|
| DE | 2360197 | 6/1975 |
| DE | 198 29 982 A1 | 4/1998 |
| DE | 197 02 752 A1 | 7/1998 |
| DE | 197 02 753 A | 7/1998 |
| DE | 197 33 193 A1 | 2/1999 |
| DE | 101 18 463 A | 10/2002 |
| DE | 102 57 237 A1 | 6/2003 |
| EP | 0943 950 A | 9/1999 |
| EP | 13 59 452 A | 11/2003 |
| JP | 08043017 A | 2/1996 |
| JP | 10300760 A | 11/1998 |
| JP | 2003 075118 A | 2/2003 |
| WO | WO88 07695 | 10/1988 |

OTHER PUBLICATIONS

H.L. Zhang et al., "Neurotrophin-Induced Transport of a β-Actin mRNP Complex Increases β-Actin Levels and Stimulates Growth Cone Motility", Neuron, vol. 31, Aug. 2, 2001, pp. 261-275.

F. Umenishi et al., "cAMP Regulated Membrane Diffusion of a Green Fluorescent Protein-Aquaporin 2 Chimera", Biophysical Journal, vol. 78, Feb. 2000, pp. 1024-1035.

M.-A. Abdul-Karim et al., "Automated tracing and change analysis of angiogenic vasculature from in vivo multiphoton confocal image time series", Microvascular Research 66 (2003), pp. 113-125.

M. A. Petersen et al., "Diverse Microglial Motility Behaviors During Clearance of Dead Cells in Hippocampal Slices", Motility of Phagocytic Microglia, 2004, pp. 195-206.

S. Bertera et al., "Body window-enabled in vivo multicolor imaging of transplanted mouse islets expressing an insulin-Timer fusion protein", BioTechniques, vol. 35, No. 4 (2003), pp. 718-722.

G. Brum et al., "Fast imaging in two dimensions resolves extensive sources of $Ca^{2+}$ sparks in frog skeletal muscle", Journal of Physiology (2000), 528.3, pp. 419-433.

H. Schmidt et al., "Mutational analysis of dendritic $Ca^{2+}$ kinetics in rodent Purkinje cells: role of parvalbumin and calbindin $D_{28k}$", Journal of Physiology (2003), 551.1, pp. 13-32.

ANONYMOUS: "2P Scanning Microscopy" Internet, Dec. 18, 2003 XP0023117009.

C. Lohr et al., "Use of the Digital Signal Processor and Acousto-optic Tunable Filters in Ratiometric Confocal Calcium Imaging" Internet , Jan. 17, 2004 XP002317010.

M. Gustafsson, "Double the lateral resolution of wide-field fluorescence microscopy using structured illumination", Three-Dimensional and multidimensional microscopy: Image acquisition processing VII, Proceedings of SPIE, vol. 3919 (2000), pp. 141-150.

G. Gimpl et al., "Cholesterol and steroid hormones: modulators of oxytocin receptor function", Prog. Brain Research, 2002, vol. 139, pp. 43-55. (Abstract only).

D. Soll et al., "Computer-Assisted Reconstruction and Motion Analysis of the Three-Dimensional Cell", The Scientific World Journal, 2003, vol. 3, pp. 327-841. (Abstract only).

R. Grossmann et al., "Juxtavascular microglia migrate along brain microvessels following activation during early postnatal development", GLIA, vol. 37, Issue 3, pp. 229-240. (Abstract only).

N. Yamamoto et al., "Real-time imaging of individual fluorescent-protein color-coded metastatic colonies in vivo", Clinical and Experimental Metastasis, vol. 20, No. 7, Nov. 2003, pp. 633-638. (Abstract only).

\* cited by examiner

Sine-shaped Control Profile

X — Positioning direction of the x scanner
Y — Positioning direction of the y scanner
$X_{target}$ — Projection of the target point upon the positioning direction of the x scanner
$Y_{target}$ — Projection of the target point upon the positioning direction of the y scanner A schematic representation of the position of an illumination point within the x/y/z space 1 - Representation of x-z cross-section
2 - Representation of x-y cross-section
3 - Representation of y-z cross-section
4 - Defined curve
5 - Making of x-y section plane
6 - Making of x-z section plane
7 - Making of y-z section plane
8 - x-y section plane
9 - x-z section plane
10 - y-z section plane Schematic representation of the two-dimensional scanning area of the manipulation and imaging scanner of a fast (parallelizing) line scanner

US 7,271,382 B2

PROCESS FOR THE OBSERVATION OF AT LEAST ONE SAMPLE REGION WITH A LIGHT RASTER MICROSCOPE WITH LIGHT DISTRIBUTION IN THE FORM OF A POINT

BACKGROUND OF THE INVENTION (1) Field of the Invention

The invention relates to a process for the observation of at least one sample region with a light raster microscope by a relative movement between the illumination light and sample.

(2) Related Art

In DE 19702753A, DE 19702752A, and U.S. Pat. No. 6,037,583 laser scanning microscopes are described.

Along with the X/Y movement of the light point over the sample, which usually is produced by galvanoscanners, it is a known practice to also perform a z-movement in order to acquire image stacks in depth.

This movement in the z-direction is done, for example, mechanically by movement of the objects by means of a z-movement of the sample tray (piezo tray, HRZ tray in U.S. Pat. No. 6,636,351) or also by movement of the objective (for example, objective with piezo drive).

Here, in the first case, a target position in the z-direction can be predefined, where a measured value acquisition occurs after ending the feed movement of the z-drive or, in the second case, there is a continuous movement in the z-direction, where after the termination of a run-in phase of the positioning movement of the z-drive (acceleration phase) a measured value acquisition is done continuously or discontinuously.

The first variant is very slow.

The second variant does, in fact, make possible, for example, the rapid acquisition of a z-stack. Between sequential z-scans, however, a pause for braking or accelerating of the z-drive is needed until the predefined movement has begun.

SUMMARY OF THE INVENTION

The present invention is directed to a process for the observation of at least one sample region with a light raster microscope by a relative movement between the illumination light and sample via first scanning means along at least one scanning axis essentially perpendicular to the illumination axis wherein the illumination light illuminates the sample in parallel at several points or regions and several points or regions are detected simultaneously wherein at an angle to the plane of the relative movement, preferably perpendicular thereto, second scanning means are moved and an image acquisition takes place by the movement of the first and second scanning means being coupled and a three-dimensional sampling movement being done by the illumination of the sample wherein the second scanning means are coupled to the movement of the first scanning means in such a manner that straight and/or curved lines and/or plane and/or curved surfaces are scanned which are extended along at least one scanning direction of the first scanning means as well as along the scanning direction of the second scanning means.

DETAILED DESCRIPTION OF THE PREFERRED EMBODIMENTS

Through the invention, as described in the following, in particular in the independent and subordinate claims, a rapid z-focus is produced by the operation of the z-drive via, in particular, periodic control signals, with coordination of the measured value acquisition and the control of the z-drive based on the mechanical and electrical properties of the system.

The z-movement is done advantageously by movement of the objective via piezo drive or galvanometer drive or by z-movement of the sample via piezo drive or galvanometer drive.

For the particularly rapid z-movement of the light spot, adaptive optics in the illumination beam path of the microscope are also suitable. These move the light spot in the sample by defocusing in the z-direction (DE19733193A1).

According to the invention different control modes for the z-movement can be realized.

The scanner control for x and y is, for example, described in DE 19702752A.

Figure 5:
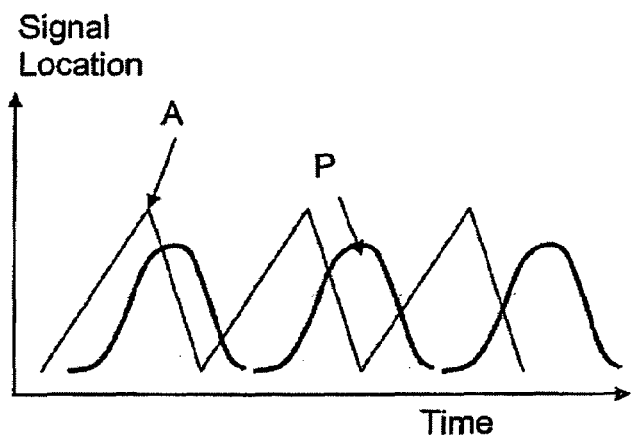
FIG. 5 is a graph representing a linear control (control signal A) with rapid sample movement P (high frequency) as a function of time.

In FIG. 5 a linear control (control signal A) with rapid sample movement P (high frequency) is represented as a function of time.

The movement P is distorted by electrical and mechanical properties of the system (for example, inertia, resonance frequencies).

Here it is represented that despite linear control as of a frequency of typically 1 Hz or more the resulting z-movement runs with undefined curve form.

Figure 6:
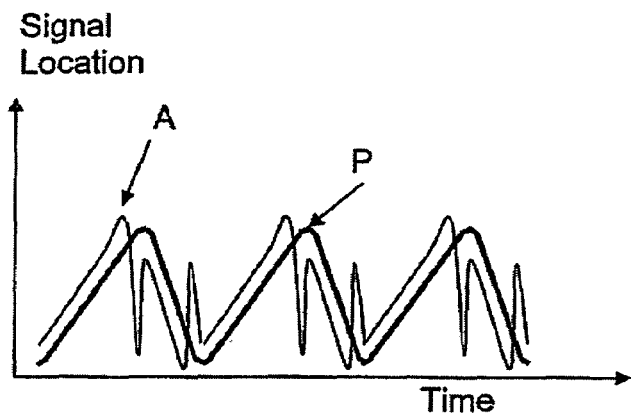
FIG. 6 is a graph representing an advantageous linearization of the z-scanning movement.

In FIG. 6 an advantageous linearization of the z-scanning movement is thus represented.

A pre distorted control A adapted to the system is represented. The movement P is linear transmission through the system (up to small reversing areas).

That is achieved by the periodic control signal being distorted in such a manner that the distortions characteristic for the system in question, which are related to the non-ideal electrical and mechanical transmission of the control signals, are compensated.

The control curves can, for example, be determined empirically in advance with the aid of values from position sensors which register the scanner position and by the inclusion of error curves and selective correction.

Likewise, the transmission function of the system can be measured directly with the aid of values from position sensors which register the scanner position. The transmission function of the system gives for each frequency used the deviation of the real movement between the sample and the light spot from the predefinitions by the control signals. For each frequency there is a phase shift (for example, delay due to the transmission) and an amplitude change (for example, damping due to the transmission).

The knowledge of the transmission function of the system makes possible the selective calculation of a desired curve for the movement between the sample and the light spot in a suitable control curve for the generation of this movement. The empirical determination of the suitable control curve or also the selective calculation of the control curve can advantageously be done by a suitable Fourier series expansion of the control signal and the variation of the Fourier coefficients. Depending on the precision demanded in the case in question, the coefficients above the limiting frequency can be left out of consideration.

The position sensors which register the scanner position can, for example, be optical or capacitive.

In order to achieve, in z, a movement curve P for the sample which exactly corresponds to the predefinition (for example, exactly linear movement, that is, constant speed in the range used), a pre-distortion of the periodic control signal of the z-drive (for example, piezo) is done in such a manner that the mechanical movement corresponds exactly to the desired course of movement (for example, linear curve over time).

The distortions occurring depending on the frequency composition of the control signal and due to the frequency-dependent transmission functions of the z-drive (differences between control signal curve (predefinition) and movement curve) are compensated in so doing.

The measured value acquisition by the laser scanning microscope is then done, for example, at temporally constant intervals (reversing areas of the scanning movement excepted).

The linearization (determination of the pre-distortion) is done, for example, via Fourier coefficients.

The generation of the scanner control signals is done via a Fourier expansion:

$$Pos(t) = \frac{8}{\pi^2}\left\{\frac{a_1}{1^2}\cos(1 \cdot f \cdot t + \varphi_1) + \frac{a_3}{3^2}\cos(3 \cdot f \cdot t + \varphi_3) + \frac{a_5}{5^2}\cos(5 \cdot f \cdot t + \varphi_5) + \ldots\right\}$$

$a_1, a_3, a_5, \ldots$ :amplitude coefficients
$\varphi_1, \varphi_3, \varphi_5, \ldots$ :phase coefficients
f: ground frequency of the scanning movement
t: time
Pos(t): deflection of the scanner mirror The individual coefficients for the amplitudes and phases ($a_1$, $\varphi_1$) serve for the calibration of the movement of the scanner.

In the case of an (in practice not possible) ideal, distortion-free conversion of the control signals into the scanning movement, the ideal Fourier series of the delta function $$a_i=1, \varphi_i=0 (i=1,3,5,7,\ldots)$$

would result for the movement in the form of a symmetric delta curve.

The individual frequency components of the control signal are typically transmitted by the scanning system nearly independently of one another (depending on the linearity of the system).

In practice an ideal delta curve for the deflection of the scanner mirror cannot be implemented. This would have infinitely high accelerations of the scanner mirror at the reversing points as a consequence.

Thus, we restrict ourselves in the scanning of an image (line-by-line scanning of a sample region) to a usable range of the movement of the scanner. The braking and acceleration of the mirror is done outside of this range.

Typical for scanning microscopy are usable ranges of ca. 85% of the scanning period.

Advantageously a simple and selectively directed calibration is possible.

Alternatively, a linearization of the movement of the scanner can also be done via a control curve which is variable for calibration and generated directly through look-up tables. Advantageously, this variable control curve can also be generated through variable splines.

These are predefined measurement points whose rise in their vicinity is predefined in addition, which leads to a smoother form of the curve.

A calibration of the control curves can also be done via so-called FITT algorithms (variation of the look-up tables up to which movement is linear).

The calibration can be done via position or speed sensors installed in the movement system (for example, electrical or optical position sensors installed in the z-drive) or via an optical evaluation of a signal (3D calibration sample, for example, equidistant scattering or reflecting planes in the sample or a sample grid) generated (for example, re-scattered) by a calibration sample.

A calibration can also be done via an external measuring system (for example, electronic μm clock on the sample tray or on the objective).

Figure 7:
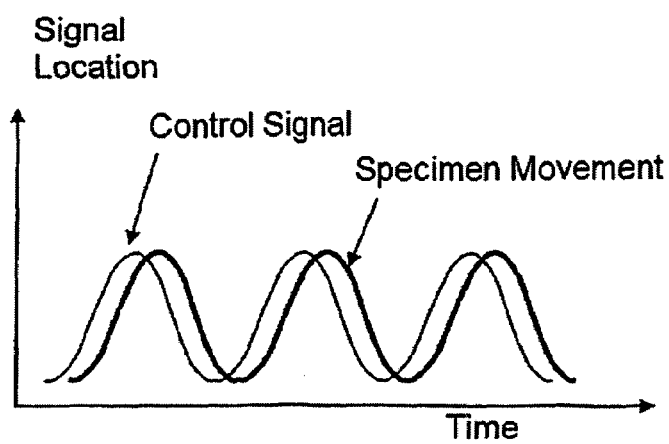
FIG. 7 is a graph representing an additional control mode.

In FIG. 7 an additional control mode is represented.

A periodic z-movement occurs whose form can be adapted to the mechanical or electrical limits of the system "moved mass+drive".

The advantage is a lower mechanical load on the sample and system.

This can, for example, advantageously be a sinusoidal scanning movement.

The operation of the system "moved mass+drive" can in this case also be done in resonance, where previously the resonant frequency is determined empirically. Thereby very high amplitudes at high frequencies are made possible.

A measured value acquisition by the laser scanning microscope can, for example, be done at temporally or positionally constant intervals, where, for example, the measured value is triggered with an installed position sensor.

That means that there is always measurement when the desired z-position is reached (or, for example, an x-y scan is triggered). For a temporally controlled measured value acquisition, a calibration carried out in advance supplies the association of measurement time points and z-position (for example, by means of a look-up table).

A defined, calibrated control of the individual scanning axes in the system makes possible in an advantageous manner a synchronous control of the desired scanning axes and the a selective control of the direction of movement of the light spot in the sample volume.

The points in time for the measured value acquisition could also be calculated from the control curve.

A measured value acquisition can be done at temporally constant intervals.

A retroactive de-distortion of the image or z-image stack on a linear movement curve is done by means of a calibration carried out in advance or with the aid of position measurements taken synchronously to the measured values.

Generally the measured value acquisition can also be done bi-directionally (forward and backward direction) to accelerate the image acquisition in periodic scanning movements (in x, y, and z).

Advantageous scanning strategies for the advantageous combination of the three fast axes x, y, z are explained in more detail in the following with the aid of the schematic representation in FIG. 4.

Figure 8:
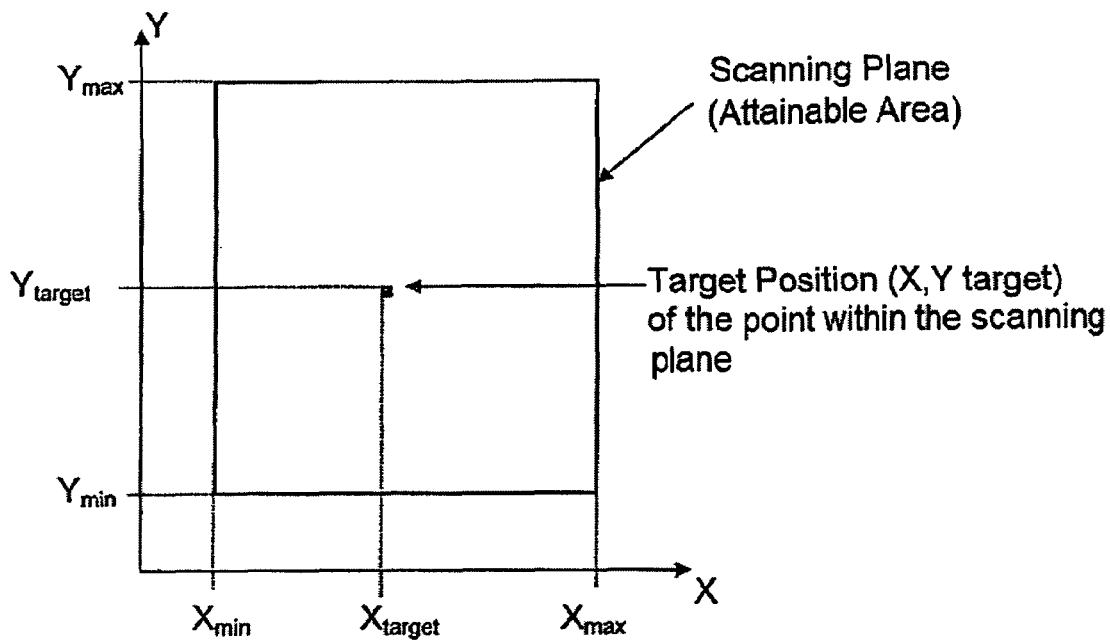
FIG. 8 is a diagram representing an X/Y sampling.

In FIG. 8 an X/Y sampling is represented schematically.

A scanner (X) makes possible by control with a variable control voltage the free positioning of a laser spot in the sample along a line (normally a straight line) ($X_{min}$ . . . , $X_{max}$)

With a second scanner (Y) (axis of rotation in an advantageous manner perpendicular to the axis of rotation of the first scanner) the spot can be positioned freely within a surface (normally a plane=scanning plane) ($X_{min}<X<X_{max}$, $Y_{min}<Y<Y_{max}$).

In order to traverse to a predefined position within the scanning plane, the first scanner X) is controlled with the position voltage which corresponds to the projection of the target point on its positioning device ($X_{target}$). Simultaneously, the second scanner is also controlled with the position voltage which corresponds to the projection of the target point on its positioning device ($Y_{target}$).

Figure 9:
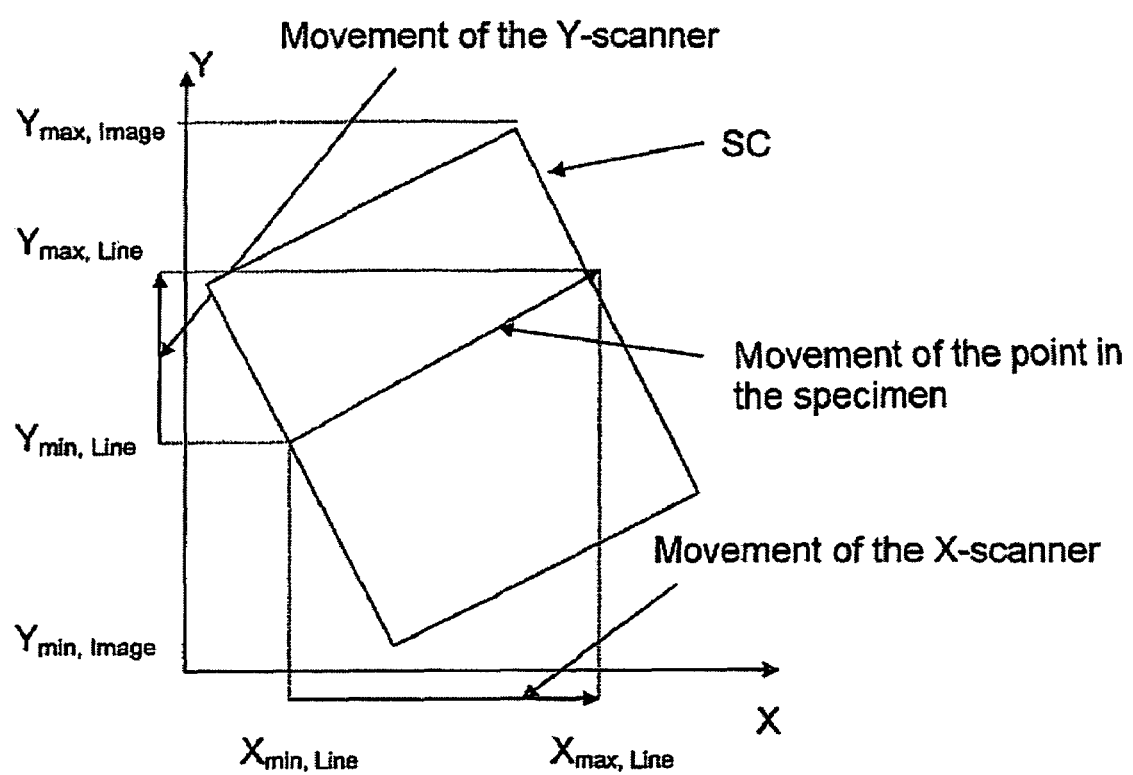
FIG. 9 is a diagram representing how by means of the coordinated synchronous control of the X-scanner and Y-scanner a scanning field SC oblique to the x-axis and y-axis can be generated.

In FIG. 9 it is represented how by means of the coordinated synchronous control of the X-scanner and Y-scanner a scanning field SC oblique to the x-axis and y-axis can be generated by each of the X-scanner and Y-scanner being moved simultaneously and with uniform speed when traversing a scanning line.

The angle of the obliqueness is set by setting the amplitude ratio of the voltage signal the scanners.

With a third scanner (Z) (axis of rotation advantageously perpendicular to the axis of rotation of the first scanner and perpendicular to the axis of rotation of the second scanner) the spot can be positioned freely within a sample volume (scanning volume) limited by the maximal angle of deflection of the scanners ($X_{min}<X<X_{max}$, $Y_{min}<Y<Y_{max}$, $Z_{min}<Z<Z_{max}$).

In order to traverse to a predefined position within the scanning volume, all three scanners (X, Y, and Z) are simultaneously (analogous to the case with 2 scanners) controlled with the position voltage which corresponds to the projection of the target point on the positioning device of the respective scanner ($X_{target}$, $Y_{target}$, $Z_{target}$).

By traversing a sequence of target positions, sample regions which can be defined in advance can be traversed.

The sample regions can be one-dimensional, two-dimensional, or three-dimensional.

Sequential traversing of points which lie on a line (for example, straight lines) corresponds to a line scan (scanning of a line) (one-dimensional).

If only one scanner is moved, e.g. the X-scanner, a straight line is acquired which is parallel to the direction of movement of the scanner.

A line scan rotated in the plane is generated by synchronized movement of two scanners (see FIG. 5). Arbitrarily rotated straight lines, e.g. in the XY plane, can be generated.

By sequential scanning with simultaneous movement of two scanners a closed, arbitrarily formed line (spline) can be generated.

Sequential traversing of several lines, one after the other, generates a surface scan.

Often the lines lie within a plane—a two-dimensional plane scan is done.

A sequential traversing of straight lines in the direction of movement of the scanners (rectangular scan) is customary. A scanner is in this case moved rapidly (X, line scanner) and after each line the other scanner (Y, image scanner) is moved a bit further (change of the offset) and thus an offset between the lines is generated perpendicular to the lines.

An arbitrarily rotated rectangle in a plane can be generated (FIG. 9).

A sequential traversing of several plane scans, where, for example, one lies over the other, generates a volume scan (three-dimensional).

Advantageous processes and modes of action in the case of the light spot's movement which is in three spatial coordinates, coordinated with one another, and rapid according to the invention is intended to be explained in the following.

Figure 10:
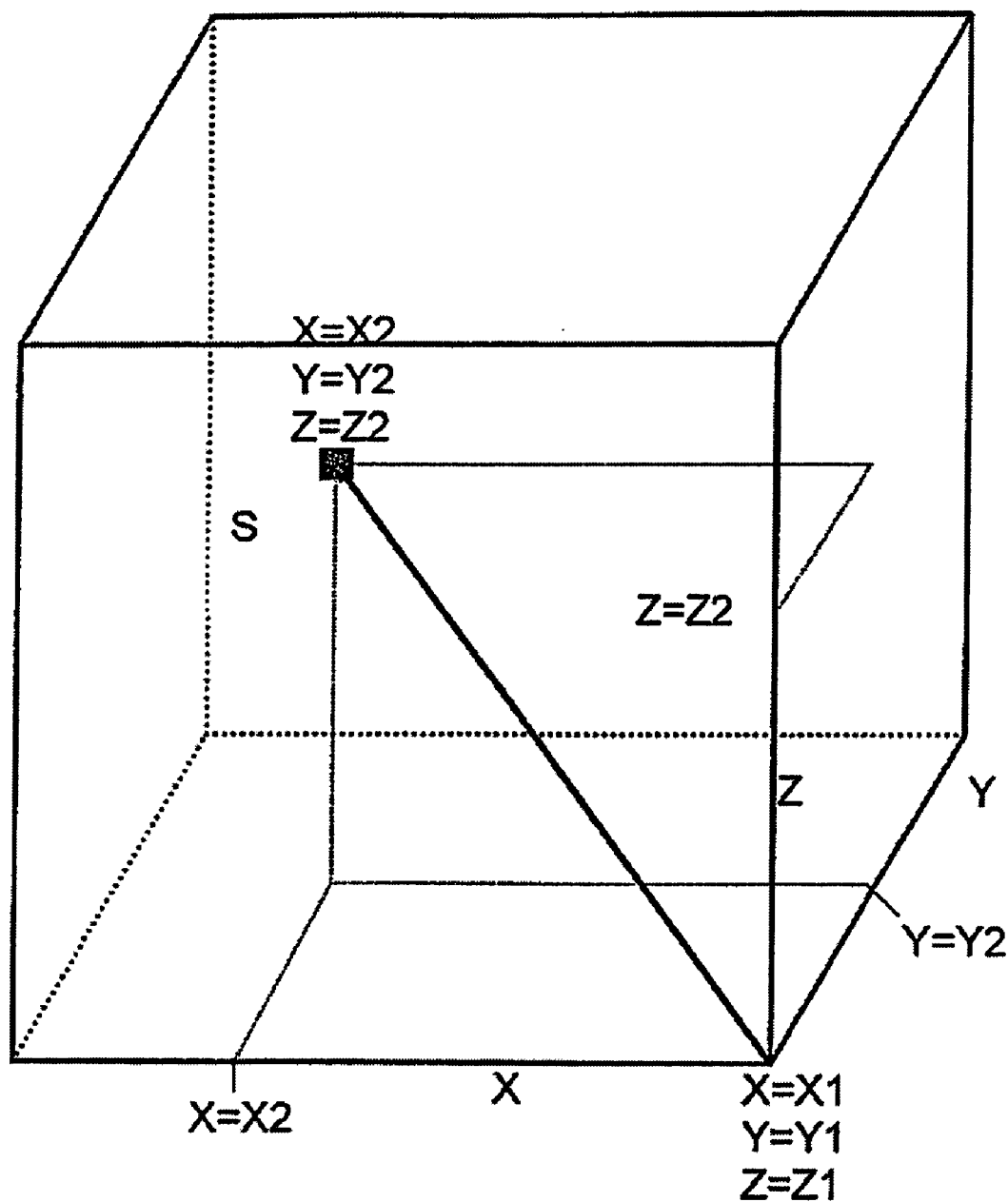
FIG. 10 is a schematic diagram showing the position of a light spot in the X/Y/Z space.

FIG. 10 shows schematically the position of a light spot in the X/Y/Z space.

The position of the light spot is advantageously changed by control of the scanners which are coordinated with one another as follows:

X-scanner, Y-scanner, and Z-scanner scan synchronously (see figure!).

At the point in time t=T1 the three scanners are at the start point of the line (X1, Y1, Z1)

X-scanner is at X=X1

Y-scanner is at Y=Y1

Z-scanner is at Z=Z1

In order to achieve a straight-line movement of the spot in the sample volume, the form of the control signal of all three scanner is chosen so that in an individual control of the scanners a saw-tooth or triangular form movement of the spot in the sample would arise (possibly the control signals must be pre-distorted).

The selective deflection is done, therefore, relative to the zero axis of the vibration, either symmetrically upwards and downwards (bidirectional scan) or in the reverse direction of the movement steeper (saw-tooth) for a unidirectional scan in which traversing back into the starting positions should be as rapid as possible.

At the start point (X1, Y1, Z1) all three scanners (at the same time) are at an extreme point (reversing point) of their periodic movement.

All three scanners run with the same ground frequency, that is, after the time Tp (period time) all three scanners are once again at their starting point (starting point of the line).

The amplitude of the scanning movement is chosen so that after the expiration of the half period (that is, when all three scanners have arrived at their periodic movement's extreme point opposite their starting point, time point t=T2), all three scanners appear at the end point of the line (X2, Y2, Z2).

X-scanner is at X=X2
Y-scanner is at Y=Y2
Z-scanner is at Z=Z2

That means that the amplitude X-scanner=X2−X1, amplitude Y-scanner=Y2−Y1, and amplitude Z-scanner=Z2−Z1.

This form of control causes the scanning of a straight line from point (X1, Y1, Z1) to point (X2, Y2, Z2).

The starting point and ending point can be freely chosen within the sample volume, that is, the length and the orientation of the line can be freely chosen.

For arbitrary alignment of the scanning direction in the sample volume, there is a synchronous control of all three scanners analogous to the synchronous control of the two scanning axes for rotation of the direction of scanning in the plane.

In the case of an HRZ tray a movement of the sample tray is done with a galvanoscanner which advantageously according to the invention is controlled as the x/y scanner.

The current through the operating coil of the galvanoscanner is controlled by means of regulation electronics with the aid of the position sensor in such a manner that the totality of the regulation circuit and scanner traverses to the position which is predefined by mean of a control signal.

In the case of a resonance scanner the input quantity for the regulation circuit is then not the position+theoretical value (control signal) but rather typically the amplitude (sensor) and theoretical value.

One can naturally also move the objective with a galvanoscanner or with a resonance scanner (the weight of the objective then determines the resonance frequency!).

In the case of a movement of the sample tray of the objective with a piezo element a change of the position is accomplished by changing the high voltage applied to the piezo.

Since the regulation circuits can be too slow or produce errors, there must be calibration in both cases, at least as of certain speeds, that is, the control signals (=theoretical values for the electronic regulation circuits) are changed (pre-distorted) so that the actual movement corresponds to the desired movement.

A synchronous, rapid control in three scanning axes (x, y, and z) advantageously makes possible an arbitrary orientation of the direction of scanning in the sample volume. In this way the direction of scanning can be adapted to the characteristics of the samples.

By way of example, a line scan oriented arbitrarily in the sample space is generated, which advantageously can be aligned to a prominent sample structure.

Furthermore, a surface scan oriented arbitrarily in the sample space can be generated which advantageously can be aligned to a sample surface.

A sequential scanning of lines is done in a plane lying arbitrarily in the sample space, where an offset between the lines can advantageously be perpendicular to the lines and equidistant.

An example would be the scanning of a plane which extends over a range in z.

The scanning surface can be arbitrarily tilted and turned by rapid control of three scanners.

The direction of scanning and form of scanning can be adapted to the position and the form of the sample in all three axes, for example, open or closed spline scans with arbitrary curve in the sample space.

The scanning surface can also be arched with appropriate control of the scanners.

Line scans can likewise be correspondingly arched.

In all three axes bidirectional scanning is also possible by the periodic control for the increase of the imaging rate.

Instead of the bidirectional scanning, closed lines formed arbitrarily in space can be scanned (corresponds to a periodic movement of all three scanners). Through sequential scanning of such closed lines, arbitrarily formed surfaces in the sample volume can be scanned.

In the case of a line scanner, a coordinate can be chosen less freely.

In the case of line scanners the line is predefined as a scan form and is not generated by a scanning axis.

In the following a scanning microscope, in particular a line scanner, is explained in more detail with the aid of additional representations.

Figure 1:
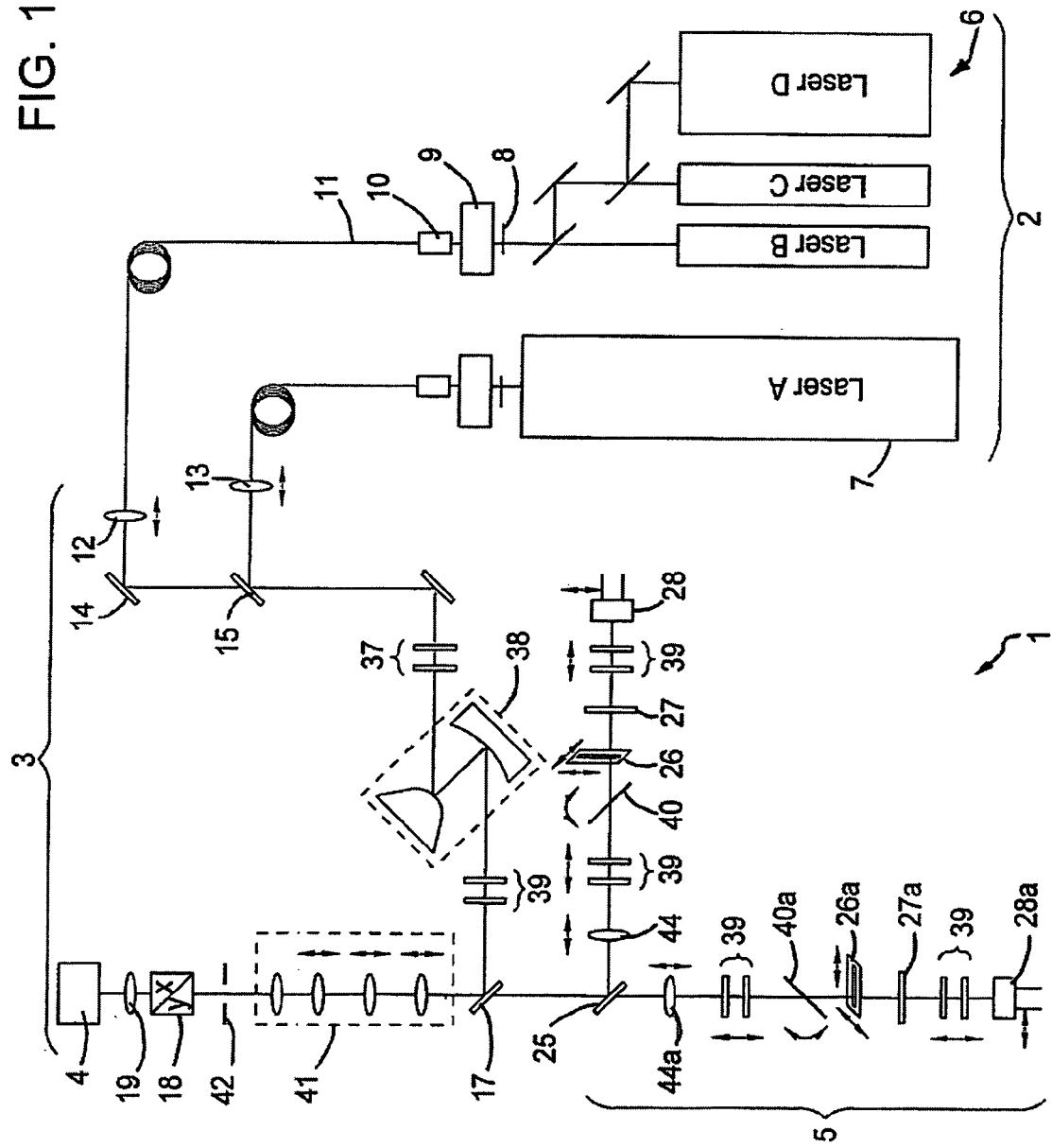
FIG. 1 is a schematic diagram of a laser scanning microscope.

FIG. 1 shows schematically a laser scanning microscope 1 which is assembled essentially from five components: a radiation source module 2 which generates excitation radiation for the laser scanning microscope, a scanning module 3 which conditions the excitation radiation and suitably deflects it for scanning over a sample, a microscope module 4 showed only schematically for simplification, said microscope module directing the scanning radiation provided by the scanning module in a microscopic beam path onto a sample, and a detector module 5 which receives and detects the optical radiation from the sample. Along with this, the detector module 5 can, as is represented in FIG. 1, be implemented with multiple spectral channels.

For the general description of a laser scanning microscope which scans point-by-point, reference is made to DE 19702753A1 which is incorporated herein by reference in its entirety.

The radiation source module 2 generates illumination radiation which is suitable for laser scanning microscopy, that is, in particular, radiation which can resolve fluorescence. Depending on the application, the radiation source module comprises for this purpose several radiation sources.

In a form of embodiment represented, two lasers 6 and 7 are provided in the radiation source module 2 after each of which a light valve 8 as well as an attenuator 9 is connected and which couple their radiation via a coupling point 10 into a light guide fiber 11. The light valve 8 acts as a beam deflector with which shutting off of the beam can be effected without the operation of the laser itself in the laser unit 6 or 7 having to be switched off.

The light valve 8 is, for example, formed as AOTF which, for shutting off a beam, deflects the laser beam before its coupling into the light guide fiber 11 in the direction of a light trap not represented.

In the exemplary representation of FIG. 1 the laser unit 6 comprises three lasers B, C, and D, in contradistinction to which the laser unit 7 contains on one laser A. The representation is therefore exemplary of a combination of individual and multi-wave length lasers which are coupled individually or also jointly to one or more fibers. Also, the coupling can be done simultaneously via several fibers whose radiation, after running through adaptation optics, is later mixed by color combiners. It is thus possible to use the most varied wave lengths or ranges for the excitation radiation.

The radiation coupled into the light guide fiber 11 is combined by means of displaceable collimation optics 12 and 13 via beam-combining mirrors 14, 15 and changed with regard to its beam profile in a beam-forming unit.

The collimators 12, 13 provide for the radiation supplied by the radiation source module 2 to the scanning module 3 being collimated into an infinite beam path. This is done in each case advantageously with a single lens which has a focusing function by displacement along the optical axis under the control of a (not represented) central control unit by the distance between the collimators 12, 13 and the respective end of the light guide fiber being variable.

The beam-forming unit, which will be explained in still more detail later, generates from the rotationally symmetric beam profiled in a Gaussian shape, as is present after the beam—combining mirrors 14, 15, a linear beam which is no longer rotationally symmetric but rather is suitable in cross-section for the generation of a rectangularly illuminated field.

This illumination beam, also designated as linear, serves as excitation radiation and is conducted via a principal color splitter 17, and still to be described zoom optics, to a scanner 18. The principal color splitter will be discussed in more detail later. Here let it merely be mentioned that it has the function of separating sample radiation returning from the microscope module 4 from the excitation radiation.

The scanner 18 deflects the linear beam monoaxially or diaxially, according to which it is bundled by a scanning objective 19 as well as a tubular lens and an objective of the microscope module 4 into a focus which lies in a preparation or in a sample in the module 4. In so doing, the optical imaging is done so that the sample is illuminated with excitation radiation in a focal line.

Fluorescence radiation excited in the linear focus in such a manner reaches, via the objective and tubular lens of the microscope module 4 and the scanning objective 19, back to the scanner 18 so that in the reverse direction, toward the scanner 18, an inactive beam is present once more. One thus also speaks of the fact that the scanner 18 descans the fluorescence radiation.

The principal color splitter 17 permits the fluorescence radiation in wave length ranges other than the excitation radiation to pass so that it is reversed via a reversing mirror (not shown) in the detector module 5 and then can then be analyzed. The detector module 5 comprises in the form of embodiment of FIG. 1 several spectral channels, that is, the fluorescence radiation coming from the reversing mirror 24 is split in a secondary color splitter 25 into two spectral channels.

Each spectral channel has a slotted diaphragm 26 which realizes a confocal or partially confocal imaging with respect to the sample 23 and whose magnitude determines the depth resolution with which the fluorescence radiation can be detected. The geometry of the slotted diaphragm 26 thus determines the sectional plane within the (thick) preparation from which fluorescence radiation is detected.

Behind the slotted diaphragm 26, a block filter 27 is also disposed which blocks undesired excitation radiation arriving at the detector module 5. The radiation which is separated off in that manner, comes from a certain depth section, and is expanded so as to be linear, is then analyzed by a suitable detector 28. Set up analogously to the color channel described is the second spectral detection channel which also includes a slotted diaphragm 26a, a block filter 27a, and a detector 28a.

The use of a confocal slot aperture in the detector module 5 is only exemplary. Naturally a single-point scanner can also be realized. The slotted diaphragms 26, 26a are then replaced by aperture shields and the beam-forming unit can be omitted. Otherwise, for such a mode of construction, all the optical elements are implemented to be rotationally symmetric. Then, naturally, instead of a single-point sampling and detection, arbitrary multi-point arrangements, such as point clouds and Nipkow disk concepts, can, in principle, be used, as will be explained later with the aid of FIGS. 3 and 4. However, it is then essential that the detector 28 is spatially resolving since there is a parallel observation of several sample points during the pass of the scanner.

In FIG. 1 it is to be seen that the Gaussian beam bundles present behind the movable, i.e. displaceable, collimators 12 and 13 are combined via a mirror arrangement in the form of the beam combining mirrors 14, 15 and, in the mode of construction shown, are subsequently converted, with a confocal slotted diaphragm, into a beam bundle with rectangular beam cross-section.

In the form of embodiment of FIG. 1 a cylinder telescope 37 is used in the beam-forming unit behind which an aspherical unit 38 is disposed which is followed by cylinder optics 39.

After the reforming there is a beam which illuminates, in a profile plane, essentially a rectangular field, where the intensity distribution along the field axis is not Gaussian in form but rather chest-shaped.

The illumination arrangement with the aspherical unit 38 can serve for the uniform filling of a pupil between a tubular lens and an objective. With this, the optical resolution of the objective can be fully exploited. This variant is thus also expedient in a single-point or multi-point scanning microscope system, e.g. in a line-scanning system (in the latter in addition to the axis in which focusing is in or on the sample).

The excitation radiation conditioned, e.g. to be linear, is deflected onto the principal color splitter 17. This is implemented, in a preferred form of embodiment, as a spectral-neutral splitter mirror according to U.S. Pat. No. 6,947,127, whose disclosure is included here in its full extent. The term "color splitter" therefore also includes splitter systems acting in a non-spectral manner. Instead of the described spectrally independent color splitter a homogeneous neutral splitter (for example, 50/50, 70/30, 80/20, or the like) or a dichroitic splitter can be used. So that an application-dependent choice is possible, the principal splitter is preferably provided with mechanics which make possible simple exchange, for example, by a corresponding splitter wheel which contains individual, exchangeable splitters.

A dichroitic principal splitter is particularly advantageous when coherent, i.e. directed, radiation is to be detected, such as, for example, reflection, Stokes or anti-Stokes Raman spectroscopy, coherent Raman processes of higher order, generally parametric non-linear optical processes such as second harmonic generation, third harmonic generation, sum frequency generation, and two and multi-photon absorption or fluorescence. Several of these processes from non-linear optical spectroscopy require the use of two or more laser beams which are superimposed collinearly. In this case the represented beam combination of the radiation of several lasers has proven itself particularly advantageous. Basically the dichroitic beam splitter widely used in fluorescence microscopy can be used. Also, for Raman microscopy it is advantageous to use holographic notch splitters or filters in front of the detectors to suppress the Rayleigh scattering.

In the form of embodiment of FIG. 1 the excitation radiation or illumination radiation is supplied to the scanner 18 via zoom optics 41 under motor control. With this, the zoom factor can be adapted and the sample viewing field can be varied continuously in a certain range of displacement. Particularly advantageous is zoom optics in which, during adaptation of the focus position and the imaging scale, the pupil position remains in a continuous adjustment process. The zoom optics 41's three motor degrees of freedom represented in FIG. 1 and symbolized by an arrow correspond precisely to the number of degrees of freedom which are provided for the adaptation of the three parameters, imaging scale, focus position, and pupil position.

Particularly preferred is zoom optics 41 at whose output-side pupil a fixed aperture 42 is disposed. In a practical, simple realization, the aperture shield 42 can also be predefined by the limiting of the mirror surface of the scanner 18. The output-side aperture 42 with the zoom optics 41 achieves the result that independently of the setting of the zoom enlargement a fixed pupil diameter is always imaged on the scanning objective 19. Thus, the objective pupil also remains completely illuminated at any setting of the zoom optics 41. The use of a stand-alone aperture shield 42 advantageously prevents the occurrence of unwanted scattering radiation in the area of the scanner 18.

The cylinder telescope 37 works together with the zoom optics 41, said cylinder telescope also being actuable by motor and disposed in front of the aspherical unit 38. This is, in the form of embodiment of FIG. 2, chosen for reasons of a compact design but does not have to be so.

If a zoom factor smaller than 1.0 is desired, the cylinder telescope 37 is automatically pivoted into the optical beam path. It prevents the aperture shield 42 from being completely illuminated when the zoom objective 41 is reduced. The pivotable cylinder telescope 37 thus ensures that even at zoom factors less than 1, i.e. independently of the setting of the zoom optics 41 at the position of the objective pupil, an illumination line of constant length is always present. In comparison to a simple viewing field zoom, laser power losses in the illumination beam are avoided.

Since on pivoting the cylinder telescope 37 a jump in image brightness in the illumination line is unavoidable, it is provided in the control unit (not shown) that the feed rate of the scanner 18 or an amplification factor of the detectors in the detector module 5 is adapted accordingly when the cylinder telescope 37 is activated in order to hold the image brightness constant.

Along with the motor-driven zoom optics 41 as well as motor-activatable cylinder telescope 37, remote-controlled adjust elements are also provided in the detector module 5 of the laser scanning microscope of FIG. 1. For the compensation of color length errors, for example, round optics 44 as well as cylinder optics 39 are provided in front of the slotted diaphragm and cylinder optics 39 are provided directly in front of the detector 28, said cylinder optics always being displaceable by motor in the axial direction.

In addition, a correction unit 40 is provided for compensation, said correction unit being described briefly in the following.

The slotted diaphragm 26 forms, together with round optics 44 disposed in front, as well as the first cylinder optics 39 also disposed in front, as well as the second cylinder optics 39 disposed behind, a pinhole objective of the detector arrangement 5, where the pinhole here is realized by the slotted diaphragm. In order to avoid an undesired detection of excitation radiation reflected in the system, the block filter 27 is introduced in front of the second cylinder lens 39, said block filter having suitable spectral properties in order to allow only desired fluorescence radiation to reach the detector 28, 28a.

A replacement of the color splitter 25 or the block filter 27 is associated unavoidably with certain tilting or wedging errors on pivoting in. The color splitter can leave a fault between the sample region and the slotted diaphragm 26. The block filter 27 can leave a fault between the slotted diaphragm 26 and the detector 28. In order to prevent a new adjustment of the position of the slotted diaphragm 26 or the detector 28 from being necessary, a plane-parallel plate 40 is disposed between the round optics 44 and the slotted diaphragm 26, that is, in the imaging beam path between the sample and the detector 28, where said plate can be brought under the control of a controller in various tilting settings. The plane-parallel plate 40 is, for this purpose, mounted, in such a manner that it can be displaced, in a suitable holder.

Figure 2:
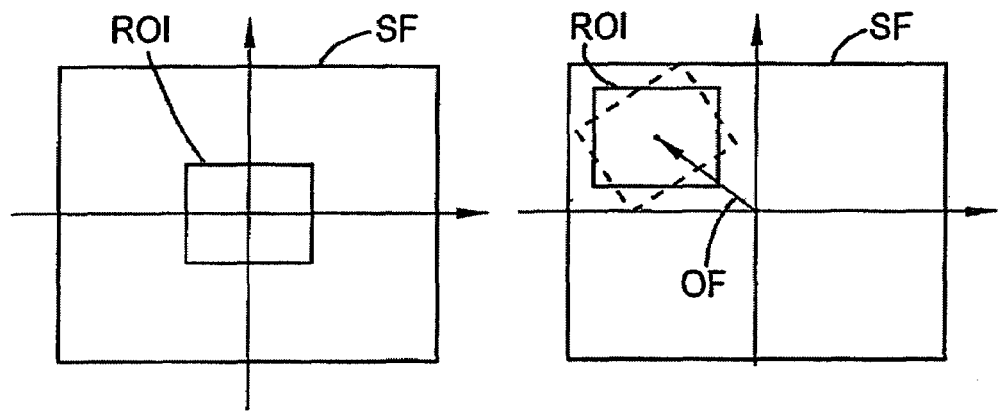
FIG. 2 shows how a region of interest (ROI) can be chosen, with the aid of zoom optics.

FIG. 2 shows how a region of interest (ROI) can be chosen, with the aid of the zoom optics 41, within the maximum available viewing field SF. If one leaves the control of the scanner 18 so that the amplitude does not change, as is necessarily required, for example, in resonance scanners, an enlargement set on the zoom optics of greater than 1.0 causes a narrowing of the chosen region ROI centered about the optical axis of the scanning field SF.

Resonance scanners are, for example, described in Pawley, Handbook of Biological Confocal Microscopy, Plenum Press 1994, Page 461ff. If one controls the scanner so that it samples a field asymmetrically relative to the optical axis, that is, to the resting position of the scanner mirror, then one obtains in connection with a zoom action an offset displacement OF of the chosen region ROI. To descan due to the already mentioned action of the scanner 18, and due to the repeated pass through the zoom optics 41, the choice of the interesting region ROI in the detection beam path is once again cancelled in the direction of the detector. Thus, one can make an arbitrary choice, lying within the scanning image SF, for the region ROI. In addition, one can obtain images for different choices of the region ROI and then combine them to form a highly resolved image.

If one would like to displace the chosen region ROI not only by an offset OF with respect to the optical axis but rather also in addition to rotate it, a form of embodiment is expedient which provides, in a pupil of the beam path between the principal color splitter 17 and the sample 23, an Abbe-König prism which, in a known manner, has, as a consequence, a rotation of the image.

This is also cancelled in the direction of the detector. Then one can measure images with different offset displacements OF and different angles of rotation and subsequently enhance it computationally to form a highly resolved image, for example, according to an algorithm as is described in the publication Gustafsson, M., "Doubling the lateral resolution of wide-field fluorescence microscopy using structured illumination" in "Three-dimensional and multidimensional microscopy: Image acquisition processing VII", Proceedings of SPIE, Vol. 3919 (2000), p. 141-150.

In U.S. Pat. No. 6,947,127 additional ROI images with a line scanner are disclosed (change effective focal length, mechanical aperture shields).

Figure 3:
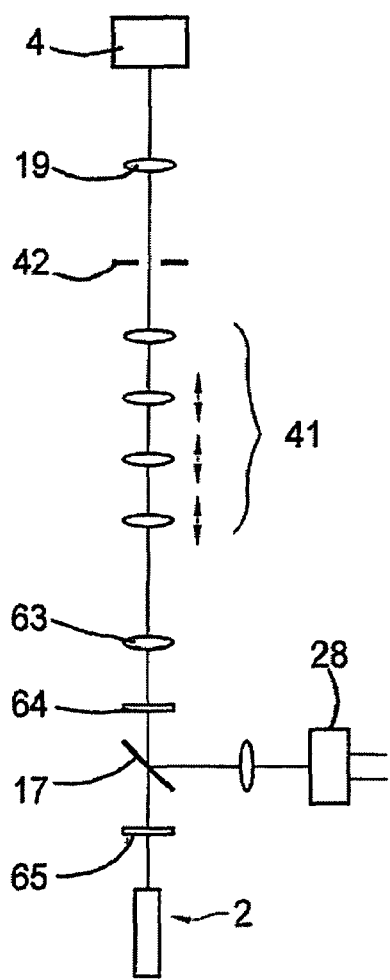
FIG. 3 shows an additional possible mode of construction for a laser scanning microscope in which a Nipkow disk approach is realized.

FIG. 3 shows an additional possible mode of construction for a laser scanning microscope 1 in which a Nipkow disk approach is realized. The light source module 2, which is represented in FIG. 3 in very simplified form, illuminates, via a mini lens array 65 through the principal color splitter 17, a Nipkow disk 64, as, for example, is described in U.S. Pat. No. 6,028,306, WO 88 07695, or DE 2360197 A1. The Nipkow disk's pinholes illuminated via the mini lens array 65 are imaged in the sample located in the microscope module 4. In order to be able to vary the sample-side image size, zoom optics 41 are once again provided.

In the conversion to the mode of construction of FIG. 1 the illumination is done, in the case of the Nipkow scanner, in the pass through the principal color splitter 17 and the radiation to be detected is mirrored out. Moreover, in the conversion to FIG. 2, the detector 28 is implemented to be spatially resolving so that the multi-point illumination achieved with the Nipkow disk 64 is also accordingly sampled in parallel. Furthermore, between the Nipkow disk and the zoom optics 41, suitable fixed optics 63 with positive refractive power is disposed which converts the radiation, exiting through the pinholes of the Nipkow disk 64 in a diverging manner, into a suitable bundle diameter. The principal color splitter 17 is, for the Nipkow layout of FIG. 3, a classical dichroitic beam splitter, that is, not the previously mentioned beam splitter with reflecting area in the form of a slot or point.

Zoom optics 41 corresponds to the previously explained mode of construction where naturally the scanner 18 is superfluous due to the Nipkow disk 64. It can nonetheless be provided if one would like to carry out the choice of a region ROI explained with the aid of FIG. 2. The same applies for the Abbe-König prism.

Figure 4:
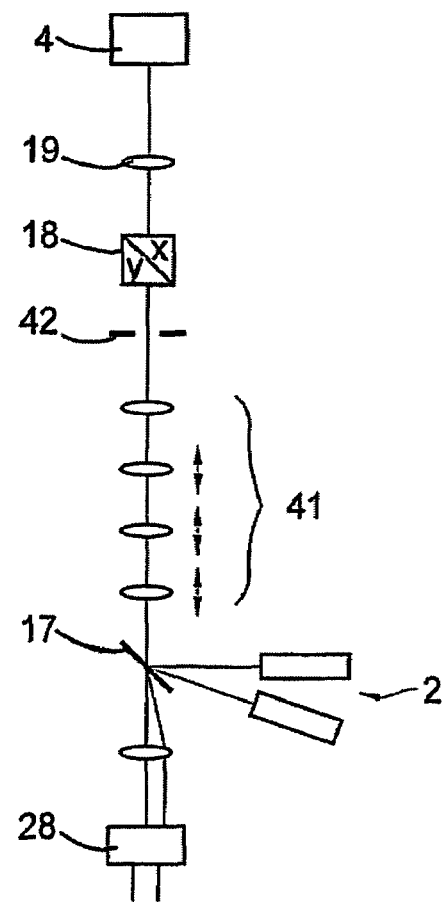
FIG. 4 is a schematic diagram showing an alternative approach with multi-point sampling in which several light sources radiate obliquely into the scanner pupil.

An alternative approach with multi-point sampling is shown in schematic representation in FIG. 4 in which several light sources radiate obliquely into the scanner pupil. Also here a zoom function as represented in FIG. 2 can be realized by the utilization of the zoom optics 41 for imaging between the principal color splitter 17 and scanner 18. By simultaneous beaming of light bundles at different angles in a plane conjugated to the pupil, light points are generated in a plane conjugated to the object plane which are guided from the scanner 18 simultaneously over a partial region of the entire object field.

The image information arises by evaluating all the partial images on a spatially resolving matrix detector 28.

As an additional form of embodiment, a multi-point sampling, as described in U.S. Pat. No. 6,028,306, comes into consideration whose disclosure is included here relating to this in its full extent. Also here a spatially resolving detector 28 is to be provided. The sample is then illuminated by a multi-point light source which is realized by a beam expander with a micro lens array disposed behind which illuminates a multi-aperture plate so that a multi-point light source is realized thereby.

The direction of the line in the sample is then normally predefined, but can, for example, be changed by rotation.

Here the choice of the inclination of the scanning plane is free, as well as an arching of the scanning surface in a direction.

Online representation of the measured data on the display device (for example, a computer screen)

Through the z-stack according to the invention (in particular in the case of the line scanner), which can be generated in rapid sequence, an online representation of forms of representation calculated from a temporal sequence of z-stacks is made possible.

For example, a three-dimensional representation can be offered to users during their orientation/navigation in the sample, advantageously from a certain direction of view.

The sample is, in this case, represented in quasi real-time on the computer screen, the time between the acquisition of the image and its representation lies on the order of magnitude of the reaction time of the user, or below it, advantageously at least under one second.

For example, a spatial representation of the measured object, in particular as a shadow projection, can also be done.

By means of different colors (for example, red/blue) or different direction of polarization for two represented partial images which the observer views with colored or polarized glasses, a stereo image synthetically generated from two partial images can be presented immediately to the user from the very rapidly prepared spatial image stack.

For example, 3D representation for red-green glasses

For example, 3D representation by means of 3d display aids (3D monitors, for example, with polarized glasses)

For example, 3D projections

For example, 3D surface profile representations and so on

The users can observe events in the sample (for example, caused by their interaction) on a three-dimensional image of the sample. The state of the art is the online representation of a section through the sample and following the measurement on offline processing of the measured z-stack to form 3D representations.

By changing the function of the focus knob on the stand in a z-displacement of the z-range scanned by the z-scanner, the user can navigate through the sample in all three spatial directions by turning the z-knob and by the customary moving of the sample tray in x and y and always obtains directly and online a spatial impression of the measured sample volume.

Additional knobs on the stand (or second allocation, for example, of the focus knob) could be utilized for the setting of the z-extension of the z-range scanned by the z-scanner. With this, the customer can choose the region visible in the z-direction.

An additional knob (or additional allocation of the focus knob) can be utilized for setting the number of z-slices or for setting the distance between the scanning planes.

All three aforementioned settings make it possible for the customer then to set said parameters with online observation of the results.

Additional advantages in application are a possible equal temporal resolution in 3 axes, a possible tracking/study/documentation of rapid dynamic processes in 3D.

A rapid 3D-tracking makes possible the tracking of rapid objects or processes in the sample in all three spatial coordinates.

Advantageously, an interactive three-dimensional spline scan is made possible with the invention In the preferred variant for an interactive definition of a 3D spline scan a representation of three orthogonal sectional planes of an already acquired image stack of the sample is used. In so doing, the images of an x-y sectional plane, an x-z-sectional plane, and a y-z-sectional plane are represented on the computer screen. The position of the sectional planes are marked by lines in the screen display. The user can change the position of the sectional planes displayed. In so doing, the z-position for the x-y sectional plane, the y-position for the x-z-sectional plane, and the x-position for the y-z-sectional plane can be chosen freely. The change of position can be done via numerical input, a slide control, or with a pointer input device.

The preferred variant is a change with a pointer input device. By marking a point in one of the three image representation for the sectional planes, the positions for the two other sectional planes are determined. With the use of a computer mouse one of the marking lines can be chosen in addition by pressing a mouse key. By moving the mouse with the mouse key pressed the marking line is displaced and thus a new position of the sectional plane is determined.

The point of intersection of three sectional planes is used for spline definition. The user marks several points on the desired spline curve by repeatedly displacing the sectional planes and activating in each case a marking function via an input device.

Figure 11:
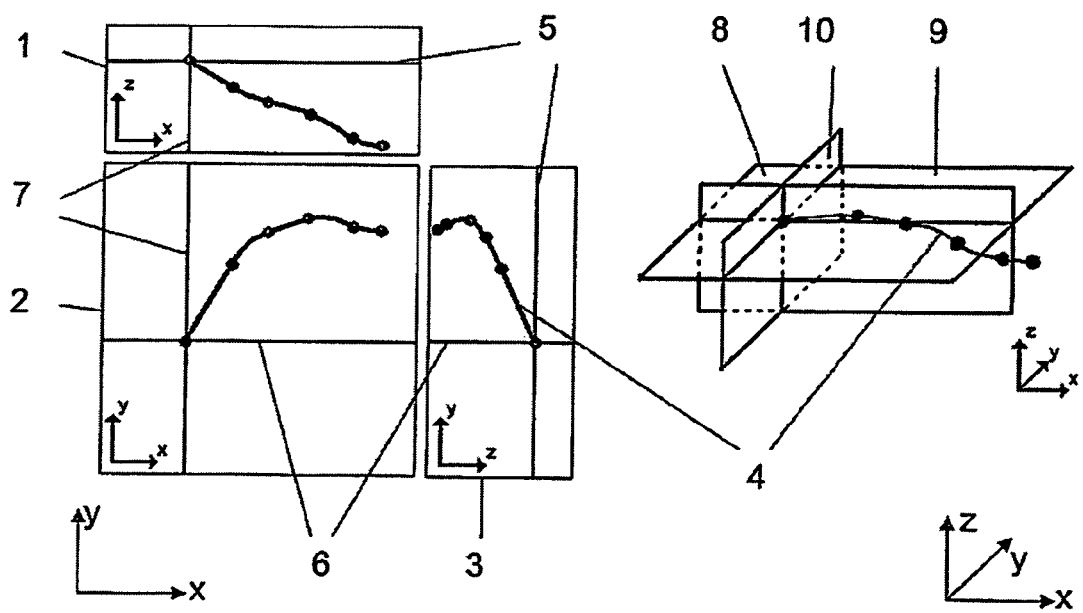
FIG. 11 is a diagram showing the point of intersection of three sectional planes used for spline definition.

In the drawing of FIG. 11 are shown:
A1: the display of the x-z section image
A2: the display of the x-y section image
A3: the display of the y-z section image
A4: a defined curve
A5: the marking of the x-y section plane
A6: the marking of the x-z section plane
A7: the marking of the y-z section plane
A8: the x-y section plane
A9: the x-z section plane
A10: the y-z section plane A simpler variant for spline definition is the use of the display only of one sectional plane, preferably the x-y plane, and a capability of displacing in the direction orthogonal to the sectional plane. With a pointer device the coordinates in the sectional plane can be determined. The third coordinate is determined by the position of the displayed image. Here the definition of points on the spline curve is also done by repeated displacing and marking the points.

In both variants there is the capability of representing the images of the sectional planes also as 3D projection on the monitor. The result of such a projection can appear as in the right part of the image. To displace a sectional plane, the user can mark it with the mouse and displace it with the mouse button pressed and mouse movement.

Also advantageous is a process with which a qualitatively better sampling of arbitrarily formed curves (splines) is made possible. The process is particularly suitable for cases where in a curved acquisition region (for example, neurons) a high sampling rate is required.

In the acquisition of a curved acquisition region (spline scan) the data are obtained at present along the sampling points of a predefined curve. This curve is positioned exactly in the sample and corrected by means of the position signal. The disadvantage of this process is that processes which take place in a small neighborhood $\epsilon$ of this curve are not registered. This requires an exact positioning of the curve and static acquisition conditions free of blurring. In time series and continuous data acquisition, individual splines in a fluorescence sample are bleached in so doing while the neighboring regions are not bleached.

Figure 12:
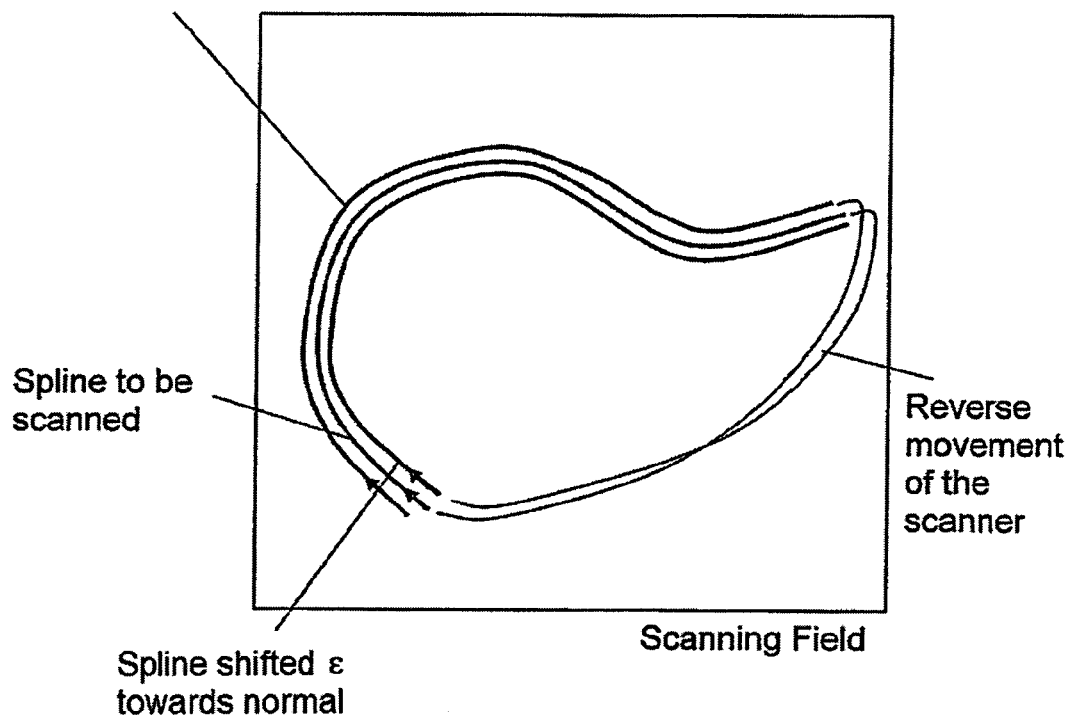
FIG. 12 is a diagram illustrating the method in accordance with the invention by which data are obtained along the sampling points of a predefined curve.

An advantageous, novel solution will thus be described (see FIG. 12):

The data are obtained, as before, along the sampling points of a predefined curve.

This process is repeated many times. In so doing, the sampling points are displaced by a small amount $\epsilon$ in the direction of the normal of the defined curve with each repetition. The displacement is done in the positive and negative direction, the amount of the displacement is variable. Via the data of corresponding sampling points of the curves there an average value is formed. In the forming of the average value there can be weighting according to the distance of the sampled points to the defined curve.

The curves can be defined by spline coordinates by which a spline curve is set (quadratic, cubic spline). With the scanners this curve is sampled.

In so doing, the AOTF is controlled so that the sample is illuminated. If the scanner has reached the end of the spline, it is moved with unidirectional image acquisition to the starting point of the curve, displaced by $\epsilon$, following in sequence. During the back-movement the sample is not illuminated by the AOTF control. For a bi-directional image acquisition the scanners are moved during the back-movement to the end point of the following spline curve. This shortens the image acquisition time.

A possible variant in the sampling is:
spline
spline displaced+$\epsilon$ in the direction of the normal
spline displaced−$\epsilon$ in the direction of the normal
spline displaced+2$\epsilon$ in the direction of the normal
spline displaced−2$\epsilon$ in the direction of the normal In this way data are also obtained in a neighborhood of the defined curve. Through the replacement-side shift of the curve the load on the sample due to bleaching is minimized.

The present laser scanning microscopes have a scanning mode "fast scan" which can be used for finding an object and for resolving. This scanning mode continuously acquires images as rapidly as possible and brings them to the display. For this purpose, the resolution is, in given cases, reduced and the scanning speed set to maximum. With this, a nearly continuous image impression results. The disadvantage is that in the confocal operation only a quite narrow view in the z-direction is displayed and thereby objects which lie over or under this plane cannot be seen. Also in non-confocal operation the planes over or under the current focus plane are imaged only quite unclearly.

In order to represent thick objects universally sharply, there is at present the possibility of exposing an image stack (lasts several seconds) and calculating it offline so that an image results therefrom with increased depth sharpness. That means the individual images of the stack are projected onto one another.

This process is much too slow to use online.

With the help of the fast line scanner described in FIGS. 1-4 it is advantageously possible to acquire up to 200 images per second. With this, 5-10 image stacks per second are therefore possible. A prerequisite is that the z-drive is fast enough, which is the case with the piezo-objective. The calculation can also be made fast enough with modern PCs so that at least 5 images per second can be represented (according to the state of the art).

That is fast enough to generate a continuous image impression which is suitable to search for certain objects in the preparation by the preparation being moved in the xy-direction.

A continuous scan of an image stack is preferably done with a fast line scanner and fast focus operation, an online calculation of the projection, and representation of the resulting image.

The speed can be increased still further by the xy-images being acquired in both directions of movement of the z-scanner (bi-directional z-scan).

Figure 13:
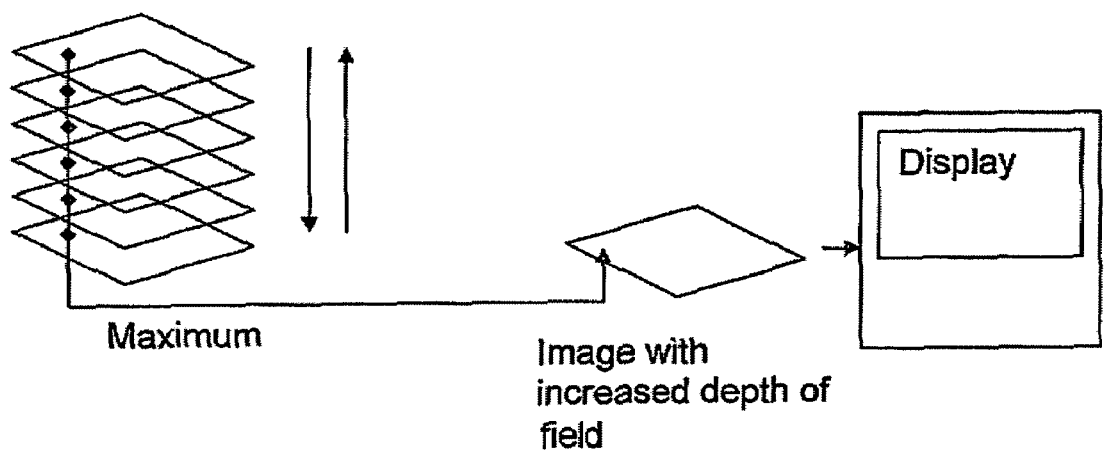
FIG. 13 is a diagram illustrating how the calculation of the image resulting from the data obtained by the method shown in FIG. 13 is carried out.

The calculation of the resulting image is carried out as follows (FIG. 13):

In the individual images of the stack, for all the pixels, the maximum among the pixels in a stack is determined and this is stored as a resulting pixel in the resulting image.

Pixresult(x,y)=max(pix(x,y,1), pix(x,y,2), . . . , pix(x, y, z))

In the scanning, the representation of the individual images is suppressed and for this only the result image is displayed.

This new scanning mode can be used for visual inspection of thick samples as well as input for automatic object recognition programs coming afterwards.

This new scanning mode can, in addition, be implemented for the previous fast scan on LSM with a line scanner.

The determination of regions of interest is not advantageously possible in three-dimensions, for example, for the bleaching of spatial regions.

In the existing confocal or 3D microscopes, regions of interest (ROIs) are 2-dimensional regions in a focus plane of the sample. Moreover, the z-extension of the focus plane in rapidly sampling systems cannot be adjusted since customarily fixed confocal apertures on a disk are used. The object of the invention are applications of a rapidly sampling confocal or 3D microscope which require simultaneous (real-time) control of several regions of interest and confocal sectional planes in 3D.

A rapidly sampling confocal or 3D microscope system as described is thus advantageously equipped with several manipulation and imaging scanners as well as an adjustable confocal aperture and controlled by real-time electronics which permit an independent rapid control of the scanning mirror, focus drives, and confocal apertures. With this, new applications in microscopy are possible which previously, above all in the study of living samples, were not possible, or possible only to a limited extent:

1. Analysis of living cells in a 3D-environment whose neighboring cells react sensitively to laser illumination and which must be protected from the illumination of the 3D-ROI,
2. Analysis of living cells in a 3D-environment with markings which are intended to be selectively bleached by laser illumination in 3D, for example, FRET experiments,
3. Analysis of living cells in a 3D-environment which are intended to be selectively bleached by laser illumination and are also intended to be observed simultaneously outside the ROI, for example FRAP and FLIP experiments in 3D,
4. Selective analysis of living cells in a 3D environment with markings and drugs which exhibit the manipulation-related changes by laser illumination, for example, activation of transmitters in 3D,
5. Selective analysis of living cells in a 3D environment with markings which exhibit the manipulation-related color changes by laser illumination, for example, paGFP, Kaede,
6. Selective analysis of living cells in a 3D environment with very weak markings which, for example, require an optimal balance of confocality against detection sensitivity.

Gimpl, G. et al. have described in 2002 in Prog. in Brain Res. 139: 43-55 experiments with ROI bleaches and fluorescence imaging for the analysis of mobility and distribution of GFP marked oxytocin receptors in fibroblasts. Therein high demands are placed on the spatial positioning and resolution as well as the direct temporal sequence of bleaching and imaging.

Zhang, et al. have described in 2001 in Neuron 31: 261-275 live cell imaging of GFP-transfected nerve cells, where the motion of granuli was analyzed by combined bleaching and fluorescence imaging. Therein the dynamics of the nerve cells makes great demands on the speed of the imaging.

Umenishi, F. et al. have described in 2000 in Bipohys. J. 78: 1024-1035 an analysis of the spatial motility of aquaporin in GFP-transfected culture cells. For this, in the cell membrane points were selectively locally bleached and the diffusion of the fluorescence in their vicinity was analyzed.

An optical sectioning through cells at arbitrary tilt angles (2D), for example, for the optimized representation of branched nerve cells can be done.

An orthogonal sectioning at very high image rate (X/Z or Y/Z)), for example, for the study of cytoskeleton dynamics can be done.

A study of fast dynamic process of living cells in 3D, for example, $Ca^{+-}$ physiology or vesicle transport is made possible.

The study of fast processes at the contact side of cells in monolayer cultures, where the optical section runs precisely parallel to the contact surface, can be done.

Figure 14:
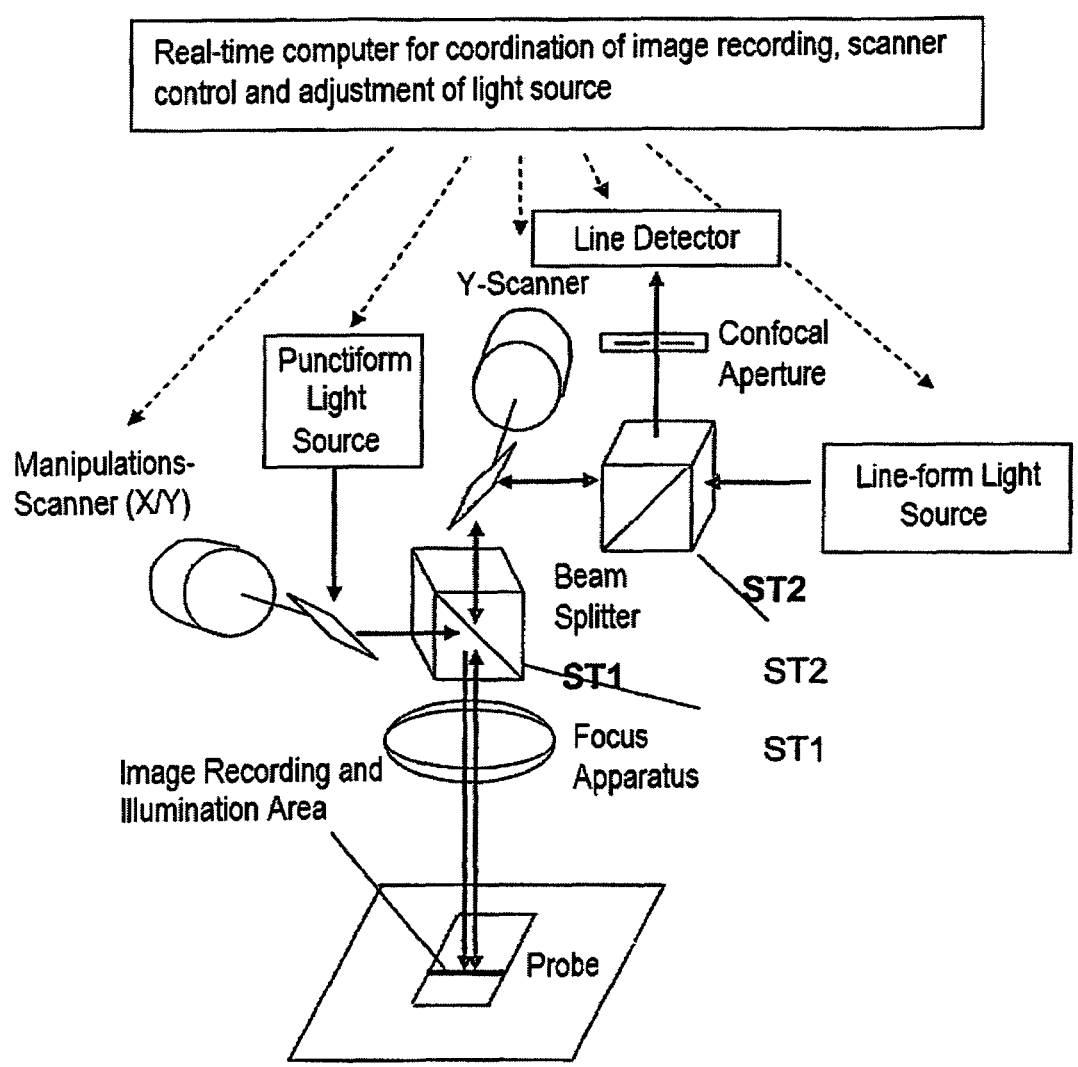
FIG. 14 shows a schematic beam path for the arrangement of a manipulation and an imaging scanner on a fast (parallelizing) line scanner.

FIG. 14 shows a schematic beam path for the arrangement of a manipulation and an imaging scanner on a fast (parallelizing) line scanner.

A linear light source with a y scanner for the movement of the line over the sample and a point light source with an x/y scanner for the point-by-point sampling in the form of a raster of the sample illuminate the sample via a beam splitter ST1.

Both scanners, as well as other elements, are connected to a common control unit (real-time computer) which realizes a common synchronized control. That also applies for a fast periodic z-displacement of the focus device which in common with the X,Y scanners makes possible a fast three-dimensional irradiation (for example, with the point scanner) and image acquisition (with the line scanner).

At the beam splitter ST2 the sample light is split in the direction of a line or surface detector in front of which a slotted diaphragm, which can be adjusted in a controlled manner relative to its aperture and which varies the z-extension of a sample section, is disposed.

Figure 15:
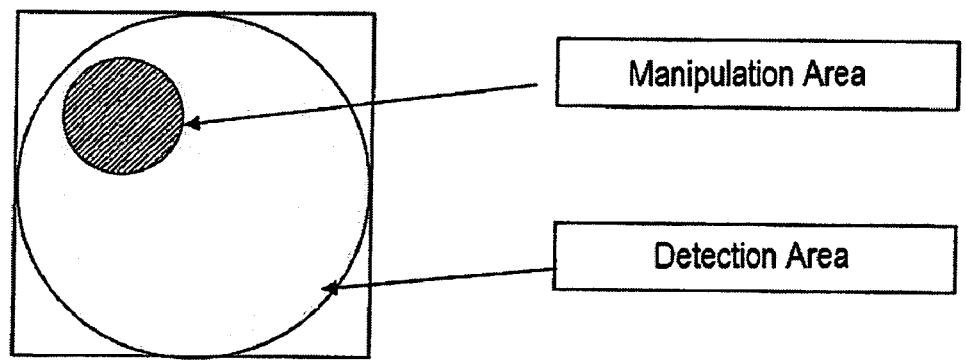
FIG. 15 shows a schematic representation of the two-dimensional scanning regions of the manipulation and imaging scanner on a fast (parallelizing) line scanner.

FIG. 15 shows a schematic representation of the 2-dimensional scanning regions of the manipulation and imaging scanner on a fast (parallelizing) line scanner.

Figure 16:
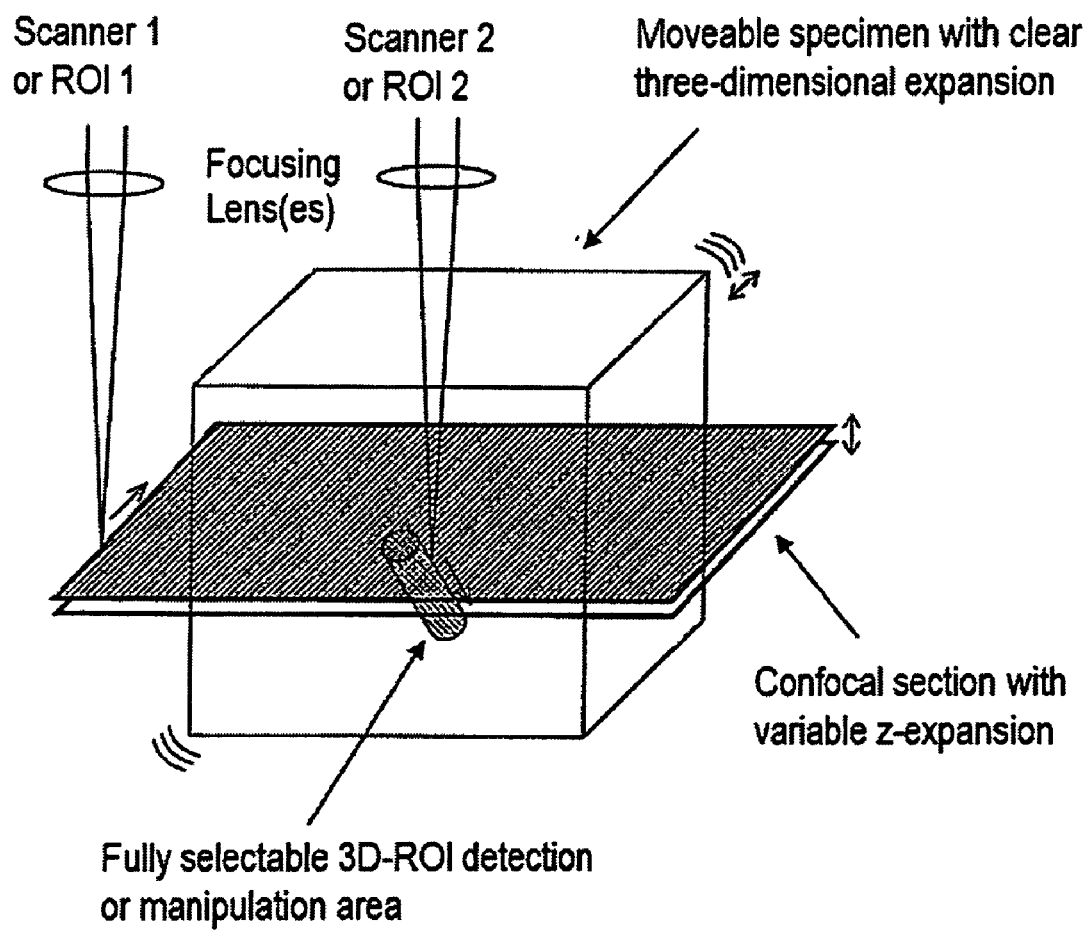
FIG. 16 is a schematic representation of the three-dimensional scanning regions of the manipulation and imaging scanner on a fast (parallelizing) line scanner.

FIG. 16 shows in schematic representation the 3-dimensional scanning regions of the manipulation and imaging scanner on a fast (parallelizing) line scanner.

Through the line scanner's control represented schematically in FIG. 16, here denoted as scanner 1, a fast image acquisition is carried out in step S depending on the chosen slotted diaphragm aperture which defines the resolution depth Z and simultaneously a 3-dimensional region ROI 2 for image acquisition is sampled, or selectively manipulated, by suitable wave length manipulations via a second scanning module (scanner 2). Imaging and manipulation can, in so doing, also take place in different z-planes of the sample by one or more focus optics being set accordingly. An ROI can be movable and the samples can be guidable for acquisition and/or manipulation of movable samples, where the sample movement is recorded in three dimensions by means of image processing and corresponding correction signals for the scanner guidance are set.

Figure 17:
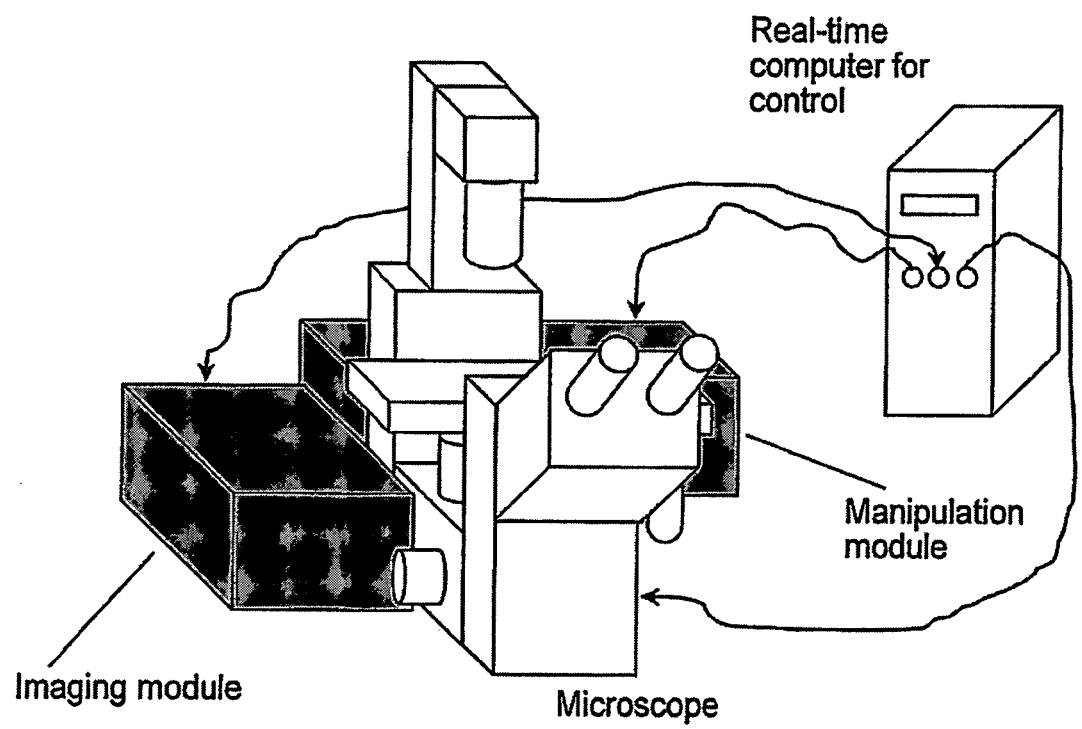
FIG. 17 shows the representation of a possible form of embodiment of the adaptation of two scanning modules (manipulation and imaging scanners) on one microscope with the use of a lateral and rear port for optical coupling.

FIG. 17 shows the representation of a possible form of embodiment of the adaptation of two scanning modules (manipulation and imaging scanners) on one microscope with the use of a lateral and rear port for optical coupling. Schematically a central computer/control unit is represented which is connected, via signal lines for control and data evaluation, to modules, coupled to a microscope stand, for image acquisition (preferably line scanner) and for the selective manipulation (scanned manipulation beam).

The invention described represents a significant expansion of the possibilities of application of fast confocal laser scanning microscopes. The necessity of such a development can easily be seen with the aid of the standard literature of cellular biology and the cellular and subcellular processes[1] there described and the study methods used with a plurality of dyes[2]. See, for example, B. Alberts et al. (2002): Molecular Biology of the Cell; Garland Science G. Karp (2002): Cell and Molecular Biology: Concepts and Experiments; Wiley Text Books.

R. Yuste et al. (2000): Imaging neurons—a laboratory manual: Cold Spring Harbor Laboratory Press, New York.

R. P. Haugland (2003): Handbook of fluorescent probes and research products, 10th Edition; Molecular Probes Inc. and Molecular Probes Europe BV.

The invention described is suitable, among other things, for the study of development processes which, above all, are distinguished by dynamic processes in the tenth of a second up to 1 hour range. Application examples at the level of united cell structures and entire organisms are described, for example, here:

Abdul-Karim, M. A. et al. have described in 2003 in Microvasc. Res. 66: 113-125 a long-term analysis of blood vessel changes in living animals, where fluorescence promoters were recorded at intervals over several days. The 3D-data sets were evaluated with adaptive algorithms in order to represent the trajectories of motion schematically.

Soll, D. R. et al. have described in 2003 in Scientific World Journ. 3: 827-841 a software-based analysis of motion of microscopic data in nuclei and pseudopodiae of living cells in all 3 spatial dimensions.

Grossmann, R. et al. have described in 2002 in Glia 37: 229-240 a 3D-analysis of the motions of microglial cells in rats, where the data were gathered over up to 10 hours. Simultaneously, very fast reactions of the glia also occurred after traumatic injury so that a high data rate and corresponding data volume arises.

The described invention is excellently suited to the study of internal cellular transport processes since therein quite small motile structures, e.g. proteins, must be represented at high speed (usually in the range of hundredths of a second). In order to record the dynamics of complex transport processes, applications such as FRAP with ROI bleaches are also often used. Examples of such studies are, for example, described here;

Umenishi, F. et al. have described in 2000 in Bipohys. J. 78: 1024-1035 an analysis of the spatial motility of aquaporin in GFP-transfected culture cells. For this, in the cell membrane points were selectively locally bleached and the diffusion of the fluorescence in their vicinity was analyzed.

Gimpl, G. et al. have described in 2002 in Prog. in Brain Res. 139: 43-55 experiments with ROI bleaches and fluorescence imaging for the analysis of mobility and distribution of GFP marked oxytocin receptors in fibroblasts. Therein high demands are placed on the spatial positioning and resolution as well as the direct temporal sequence of bleaching and imaging.

Zhang, et al. have described in 2001 in Neuron 31: 261-275 live cell imaging of GFP-transfected nerve cells, where the motion of granuli was analyzed by combined bleaching and fluorescence imaging. Therein the dynamics of the nerve cells makes great demands on the speed of the imaging.

The described invention is, in particular, suited to the representation of molecular and other subcellular interactions. Therein very small structures must be represented with high speed (in the range around one hundredth of a second). In order to resolve the molecule's spatial position necessary for the interaction, indirect techniques such as, for example, FRET with ROI bleaches are to be used. Exemplary applications are, for example, described here:

Petersen, M. A. and Dailey, M. E. have described in 2004 in Glia 46: 195-206 a two-channel recording of living hippocampus cultures of rats, where the two channels are plotted spatially in 3D and over a rather long time for the markers lectin and sytox, Yamamoto, N. et al. have described in 2003 in Clin. Exp. Metastasis 20: 663-638 a two-color imaging of human fibrosarcoma cells, where green and red fluorescent protein (GFP and RFP) were observed simultaneously in real-time, Bertera, S. et al. have described in 2003 in Biotechniques 35: 718-722 a multi-coloring of transgenic mice marked with timer reporter protein which changes its color after synthesis from green to red. The image acquisition is done as a fast series 3-dimensionally in the tissue in the living animal.

The described invention is outstandingly well-suited to the study of usually extremely fast signal transmission processes. These usually neurophysiological processes place the highest demands on the temporal resolution since the activities mediated by ions play out in the range of hundredths to less than thousandths of a second. Exemplary applications of studies in muscle or nerve systems are, for example, described here:

Brum G. et al. have described in 2000 in J. Physiol. 528: 419-433 the localization of fast $Ca^+$ activities of the frog after stimulation with caffeine as a transmitter. The localization and micrometer-precise resolution succeeded only through the use of a fast confocal microscope.

Schmidt H. et al. have described in 2003 in J. Physiol. 551: 13-32 an analysis of $Ca^+$ ions in nerve cell processes of transgenic mice. The study of fast $Ca^+$ transients in mice with altered $Ca^+$-binding proteins could only be carried out with highly resolving confocal microscopy since even the localization of the $Ca^+$-activity within the nerve cell and its precise temporal kinetics plays an important role.

The invention claimed is:

1. Process for the observation of at least one sample region with a light raster microscope having an illumination axis, comprising the steps of:
    (a) generating illumination light for illuminating a sample, the illumination light having an illumination axis,
    (b) moving the illumination light and the sample relative to each other along at least one scanning axis substantially perpendicular to the illumination axis, using a first scanner, to illuminate the sample in parallel at several points or regions,
    (c) simultaneously detecting the several illuminated points or regions, using a spatially resolving detector,
    (d) moving a second scanner at an angle to the plane of the relative movement,
    (e) acquiring an image by coupling the movements of the first and second scanners and performing a three-dimensional sampling movement by illumination into an illumination region of the sample, and
    (f) calibrating at least the second scanner with the aid of a precalibration to at least one of the mass of the sample used and the mass of the objective used and the mass of the sample tray used for the generation of a control curve, and
    wherein step (d) is carried out with the aid of an acquired calibration curve.

2. Process according to claim 1, wherein in step (d) the movements of the first and second scanners are coupled so that at least one of straight and curved lines and plane and curved surfaces are scanned, and wherein the at least one of straight and curved lines and plane and curved surfaces extend along at least one scanning direction of the first scanner as well as along the scanning direction of the second scanner.

3. Process according to claim 1, further comprising the step of generating a raster movement with the aid of at least one of the frequency response of a control signal and predefinitions from a look-up table.

4. Process according to claim 1, further comprising the step of affecting at least one of position and form and temporal change of the illumination region and the illumination conditions and the image acquisition conditions using a detection unit via a control unit.

5. Process according to claim 1, wherein the illumination region is one of:
  at least one of an arbitrarily formed and oriented line,
  at least one of an arbitrarily formed and oriented surface, and
  at least one of an arbitrarily formed and oriented volume element.

6. Process according to claim 1, further comprising the step of
  (g) generating a three-dimensional image with an image creation time/delay time no greater than the order of magnitude of a user's reaction time and presenting the three dimensional image to the user, and
  further comprising at least one of the following steps:
  (h) setting a section thickness of the observed image section, concurrently with the generating step (g),
  (i) performing a sample intervention, concurrently with the generating step (g),
  (j) setting of the illumination conditions, concurrently with the generating step (g),
  (k) setting the image acquisition conditions, concurrently with the generating step (g), and
  (l) setting one of the user's orientation and navigation in the sample, concurrently with the generating step (g).

7. Process according to claim 6, wherein the represented image is generated from several image stacks, where, by intensity comparison in each case from sample locations stacked in the direction of view, the sample location with the highest intensity is stored and represented.

8. Process according to claim 1, wherein the sample is illuminated via scanners independent of one another, where the different scanners illuminate at least one of the same and different sample regions and there is at least one of an independent and common detection of the sample light.

9. Process according to claim 1, wherein the at least one first and second scanners are provided at least partially in duplicate in a first and second system which are directed at least one of simultaneously and sequentially onto the same samples.

10. Process according to claim 1, wherein in step (a), the illumination light is a first illumination light that serves for image observation, and wherein the process further comprises the step of generating a second illumination light for illuminating a region of the sample for influencing the sample.

11. Process according to claim 8, wherein in case of a change of the illumination region by the first or second illumination light, the illumination region of the other illumination light is tracked by a common control unit.

12. Process according to claim 8, further comprising the step of influencing several sample regions at least one of simultaneously and sequentially by the second illumination light, wherein these sample regions are illuminated and detected by image at least one of simultaneously and sequentially.

13. Process according to claim 1, further comprising the step of predefining a variable spatial sample region for at least one of influencing and sample observation, using an input device.

14. Process according to claim 1, further comprising the step of representing three-dimensional sectional planes through the sample.

15. Process according to claim 13, further comprising the step of predefining the sectional planes, wherein the predefining of the sectional planes is done by the user.

16. Process according to claim 1, further comprising the step of three-dimensionally marking several points for the definition of a three-dimensional curve.

17. Process according to claim 1, further comprising the step of:
  (g) observing a sample with one of a Nipkow arrangement, a multi-point illumination arrangement, and a resonance scanner.

18. Process for the study of development processes using the process of claim 1, comprising the further step of:
  (g) studying dynamic processes in the tenth of a second up to 1 hour range, at the level of united cell structures and entire organisms, using the image acquired in step (e).

19. Process for the study internal cellular transport processes using the process of claim 1, comprising the further step of:
  (g) representing small motile structures with high speed with ROI bleaches, using the image acquired in step (e).

20. Process for representing molecular and other subcellular interactions using the process of claim 1, comprising the further step of:
  (g) representing very small structures with high speed using indirect techniques for the resolution of submolecular structures, using the image acquired in step (e).

21. Process for studying fast signal transmission processes using the process of claim 1, comprising the further step of:
  (g) studying neurophysiological processes with high temporal resolution in studies in the muscle or nerve system, using the image acquired in step (e).

22. Process according to claim 1, wherein in step (d), the second scanner is moved perpendicular to the plane of the relative movement.

23. Process according to claim 1, further comprising the step of determining at least one of a transmission function and a look-up table for the movement of the second scanner.

24. Process according to claim 1, further comprising the step of controlling at least one of the first scanner and the second scanner temporally periodically.

25. Process according to claim 1, wherein a ground frequency of the control curves of the first and second scanners is the same.

26. Process according to claim 1, wherein the step of illuminating several sample points is done simultaneously.

27. Process according to claim 1, further comprising the step of illuminating the sample with a linear light distribution.

28. Process according to claim 8, wherein the line is formed from several adjacent points.

29. Process according to claim 1, wherein in step (d), the second scanner comprises one of an objective with piezo drive and a rapidly adjustable tray and an adaptive mirror.

30. Process according to claim 8, further comprising the step of generating a second periodic raster movement in the form of a curve.

31. Process according to claim 30, wherein the curve is at least one of sinusoidal, linearly increasing, and linearly decreasing.

32. Process according to claim 18, wherein the image is generated and represented according to a pre-selected direction of view.

33. Process according to claim 32, wherein the direction of view is varied.

34. Process according to claim 1, wherein in step (e), spatially variable illumination regions are set using an input device.

35. Process according to claim 6, wherein an illumination region, predefined by the input means, follows a structure to be observed in case of change of position.

36. Process according to claim 6, further comprising the step of manipulating a sample in a set illumination region.

37. Process according to claim 15, further comprising the step of performing at least one of spatially independent manipulation and imaging, using several scanners.

38. Process according to claim 1, further comprising the step of optical 3D sectioning carried out using at least one adjustable confocal aperture shield.

39. Process according to claim 1, further comprising the step of selecting an illumination region with the aid of an overview image.

40. Process according to 10, wherein the region illuminated for image observation is greater than the region illuminated for influencing the sample.

41. Process according to claim 1, wherein in step (e), illumination of the illumination region is done repeatedly, with a displacement of acquisition coordinates being done once in opposite directions.

42. Process according to claim 17, wherein step (g) comprises analyzing living cells in a three-dimensional tissue group with markers, which exhibit manipulation related changes in color by laser illumination, in combination with living cells in a three-dimensional united tissue structure with very weak markings, which require a restriction in confocality in favor of detection sensitivity.

43. Process for the observation of at least one sample region with a light raster microscope having an illumination axis, comprising the steps of:
(a) generating illumination light for illuminating a sample, the illumination light having an illumination axis,
(b) moving the illumination light and the sample relative to each other along at least one scanning axis substantially perpendicular to the illumination axis, using a first scanner, to illuminate the sample in parallel at several points or regions,
(c) simultaneously detecting the several illuminated points or regions using a spatially resolving detector,
(d) moving a second scanner at an angle to the plane of the relative movement, wherein the first and second scanners are independent of each other, and are provided at least partially in duplicate in a first and second system which are directed at least one of simultaneously and sequentially onto the same samples,
(e) acquiring an image by coupling the movements of the first and second scanners and performing a three-dimensional sampling movement by illumination into an illumination region of the sample, and
(f) carrying out at least one of an independent and common detection of the sample light, wherein in case of a detected change within the observed illumination region by the first or second system, the observed illumination region of the other system is changed by a control unit common to both systems.

* * * * *